Jan. 22, 1957  C. J. CARAPELLOTTI  2,778,254
SCISSORS TYPE CROWN CAP REMOVER
Filed May 17, 1954  2 Sheets-Sheet 1

INVENTOR.
CHARLES J. CARAPELLOTTI
BY
ATTORNEY

Jan. 22, 1957  C. J. CARAPELLOTTI  2,778,254
SCISSORS TYPE CROWN CAP REMOVER
Filed May 17, 1954  2 Sheets-Sheet 2
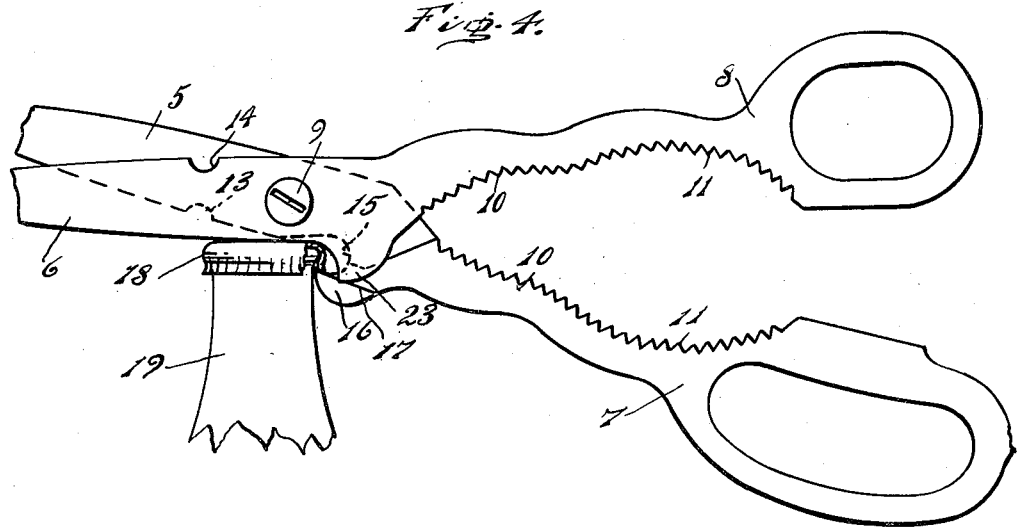
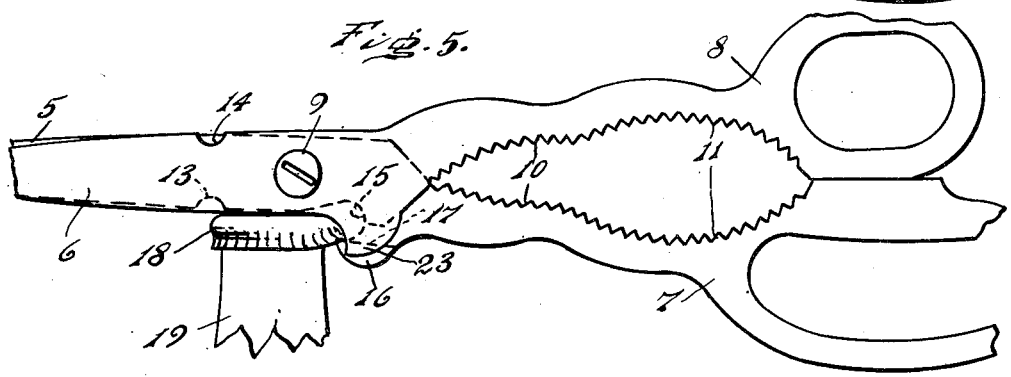
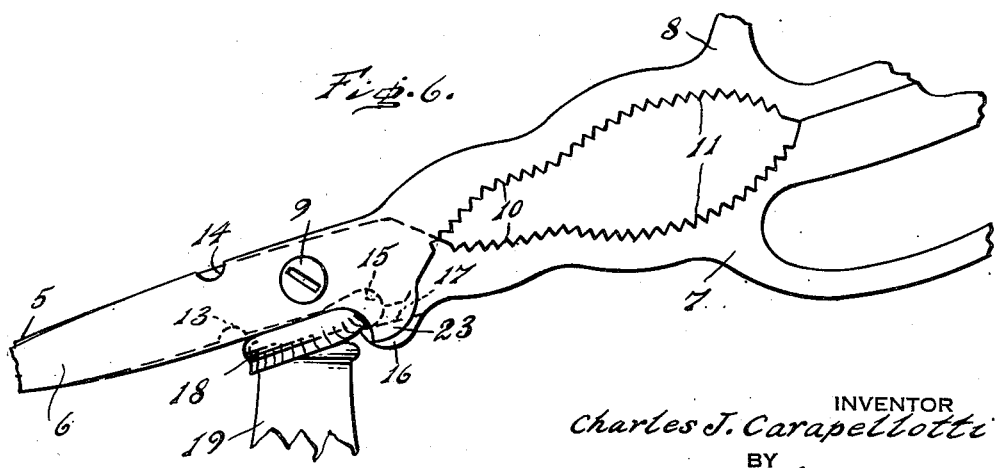
INVENTOR
Charles J. Carapellotti
BY
Jas. C. Hobensmith
ATTORNEY

United States Patent Office 2,778,254
Patented Jan. 22, 1957

2,778,254
SCISSORS TYPE CROWN CAP REMOVER

Charles J. Carapellotti, Philadelphia, Pa.

Application May 17, 1954, Serial No. 430,112

1 Claim. (Cl. 81—3.46)

This invention relates to scissors type kitchen tools, that is to say, to a tool of the scissors type having various parts incorporated therein so arranged as to permit the tool to be used for a variety of purposes.

More specifically considered, this invention relates to a kitchen tool of the scissors type having a novel arrangement of means for the removal of bottle caps and for the opening of cans containing food products and other kitchen supplies.

The principal object of the present invention is to provide a kitchen tool of the aforesaid type which may not only be used as scissors for various kitchen purposes, and which is provided with means for removing screw type jar and bottle lids, but which is also provided with a novel arrangement for the removal of crown type bottle caps, and for opening tin cans containing food products, detergents, and other materials used in and about domestic kitchens.

A further object of the invention is to provide a device of the character aforesaid having incorporated therein novel means for removing fish scales and the like.

The nature and characteristic features of the invention will be more readily understood from the following description, taken in connection with the accompanying drawing forming part hereof, in which:

Figs. 4, 5 and 6 are fragmentary elevational views illustrating the successive steps in the manipulation of the tool for the purpose of removing a bottle cap of the well known crown type.

Figure 1:
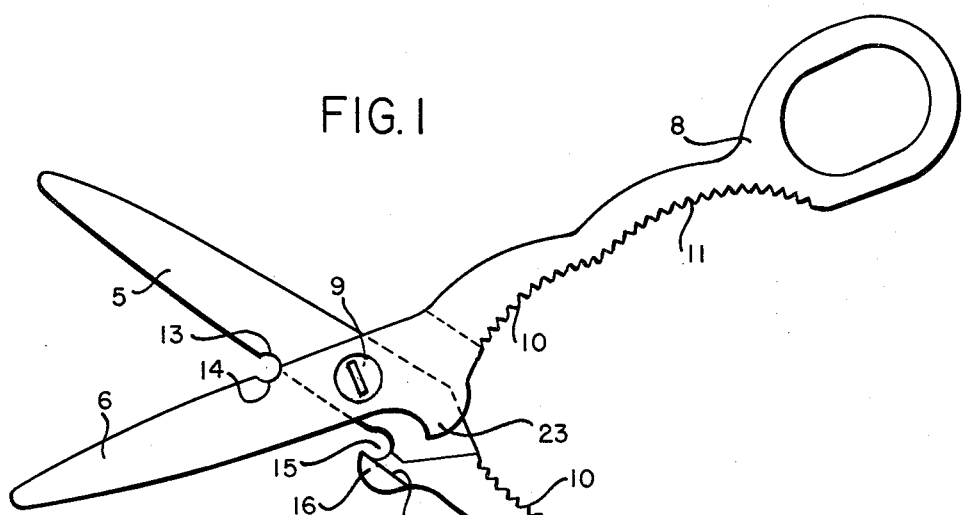
Figure 1 is a plan view of a scissors type kitchen tool embodying the main features of the present invention, the same being shown with the blades and handles in open position.
Figure 2:
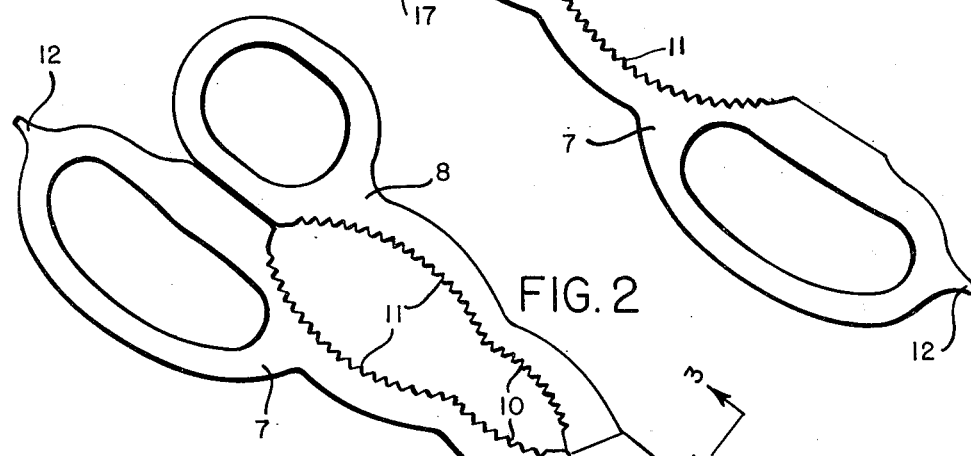
Fig. 2 is a similar view but of the opposite face, and with the scissors members in closed position.

It should, of course, be understood that the description and drawing herein are illustrative merely, and that various modifications and changes may be made in the structure disclosed without departing from the spirit of the invention.

Referring to the drawing, the tool of the present invention comprises kitchen scissors consisting of the usual cutting blades 5 and 6, having handle portions 7 and 8, respectively, the parts being pivoted to each other in the usual manner by means of a screw 9.

Each of the handle portions 7 and 8 has, on its inner margin, a pair of serrated edges 10 and 11 disposed in a curvilinear form, of two different diameters for the purpose of engaging and gripping screw tops of bottles and jars of different sizes, for the ready and convenient removal of the same.

The handle member 7 may also be provided with the usual extension 12 for the purpose of prying open bottle and jar lids of the friction or vacuum type, commonly used on various sizes of bottles, jars and cans.

Each of the blades 5 and 6 may be provided with a curved notch 13 and 14, respectively, to be used for cutting wire and for similar purposes.

The foregoing parts are more or less commonly used in kitchen tools of the scissors type, but the principal novel feature of the tool of the present invention consists of the manner of incorporating therein the device for removing bottle caps of the crown type and for opening cans of the common type, in which foods, detergents, and other kitchen products are supplied.

This novel arrangement will now be described. The scissors member, consisting of the blade portion 5 and handle portion 7, is provided, adjacent the pivot screw 9, with a recess 15 extending into the shank of the handle portion 7, thereby providing immediately to the rear of and adjacent the pivot screw 9, a protruding hook like lip 16 which is adapted to engage the under portion of a bottle cap 18 of the well known crown type for the purpose of prying the same loose from a bottle top.

The foregoing arrangement is such that when the under edge portion of the rim of a bottle cap 18 is engaged by the hook portion of the lip 16, while the handle portions of the pivoted members are separated, the outer edge portion of the blade 6 adjacent the pivot will bear against the top surface of the bottle cap 18, as shown in Fig. 4 of the drawings, and upon bringing together the handle portions of the tool, the bottle cap 18 will be pried loose on one side from the top of the bottle 19, as shown in Fig. 5 of the drawings, and upon the final raising of the handle portions in unison, as illustrated in Fig. 6 of the drawings, the bottle cap will be removed from the top of the bottle 19.

The lip portion 16 is of sufficient thickness as to permit the provision of a shoulder 17 which is adapted, when the device is used as a can opener, to engage the under edge of the outside rim 20 of the can, which is formed by shaping the marginal edge of the lid portion 21 of the can over the metal of the side wall portion 22.

Figure 3:
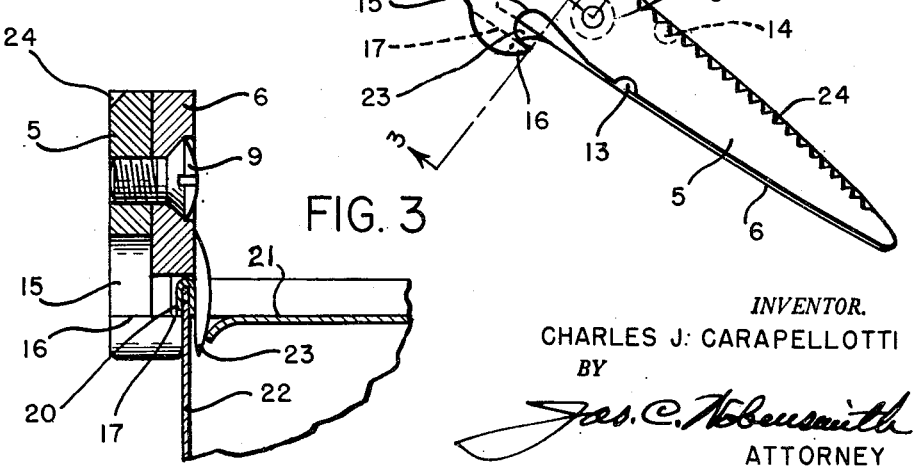
Fig. 3 is a transverse sectional view, taken approximately on the line 3—3 of Fig. 2, enlarged, the parts being shown in operative relationship with a portion of a tin can for the purpose of opening the same.

The member comprising blade 6 and handle 8 is provided with a sharpened prong or cutter 23 extending from the side of the shank of the handle portion 8 at the rear of but adjacent the pivot screw 9. The arrangement is such that when the outside rim portion 20 of the lid 21 of the can is seated on the shoulder 17, as above described, and the handle member 8 is manipulated, the cutter prong 23 will be caused to penetrate the can lid 21 on the inside of the rim portion thereof as illustrated in Fig. 3 of the drawing, it being understood that the tool is moved forwardly with each scissors like movement of the handles, whereby the central portion 21 of the lid will be sheared from the rim around the inside thereof, resulting in a smooth interior of the can, when the lid is removed, similar to that provided by can openers of the rotatable cutter type.

The foregoing arrangement is such as to permit the provision, preferably on the blade member 5, of a serrated edge portion, with the serrations extending as at 24 across the corner of said blade member, thereby to provide a useful and convenient means for removing scales from fish.

It will be seen that there is thus provided a kitchen tool of the scissors type, which will function much more efficiently than has heretofore been possible, for the removal of crown type bottle caps, as well as for the opening of cans containing food products and kitchen supplies, and which also may be so used, in addition to the usual uses of such tools, for the removal of screw top bottles and jar caps, as well as for the removal of friction or vacuum sealed caps from bottles, jars, cans and the like, and which, in addition to the foregoing, is provided with a convenient means for scaling fish and the like.

I claim:

A crown cap remover comprising a pair of members pivoted together in face to face relationship, each member having a handle portion at one end thereof, opposite side edges of one member, adjacent the pivot, lying in common planes with corresponding side edges of the other member in one position of the handle portions, one side edge of said one member having a hook-like notch adjacent the pivot, said notch forming a wall which lies closer to the pivot than the adjacent corresponding side edge of said other member and terminating in a lip which crosses and extends further from the pivot than said corresponding side edge, whereby the lip may be engaged under a crown cap skirt and said corresponding side edge can be extended across the top of said cap upon separation of the handle portions, and thereafter squeezing of the handle portions will result in a gripping and lifting of the cap skirt so that subsequent movement of the handle portions together will effect a removal of the cap from the bottle.

References Cited in the file of this patent

UNITED STATES PATENTS

| | | |
|---|---|---|
| 1,644,936 | Mertens | Oct. 11, 1927 |
| 2,027,785 | Rauh | Jan. 14, 1936 |
| 2,131,395 | Voss | Sept. 27, 1938 |
| 2,434,550 | Daniel | Jan. 13, 1948 |